(12) United States Patent
Shiohara et al.

(10) Patent No.: US 7,283,158 B1
(45) Date of Patent: Oct. 16, 2007

(54) DIGITAL CAMERA AND FUNCTION APPENDING METHOD FOR THE SAME

(75) Inventors: Ryuichi Shiohara, Nagano (JP); Yasumasa Nakajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/414,507

(22) Filed: Oct. 8, 1999

Related U.S. Application Data

(63) Continuation-in-part of application No. PCT/JP98/01251, filed on Mar. 20, 1998.

(30) Foreign Application Priority Data

| Apr. 9, 1997 | (JP) | .................................... 9-91205 |
| Mar. 12, 1998 | (JP) | .................................... 10-61019 |

(51) Int. Cl.
- H04N 5/225 (2006.01)
- H04N 5/76 (2006.01)
- G06F 9/445 (2006.01)
- G06F 15/16 (2006.01)
- H04B 1/38 (2006.01)

(52) U.S. Cl. .............................. 348/207.1; 348/207.2; 348/231.6; 717/178; 709/232; 375/219

(58) Field of Classification Search ................ 348/207, 348/231; 396/396
See application file for complete search history.

(56) References Cited

U.S. PATENT DOCUMENTS

| 5,477,264 A | * | 12/1995 | Sarbadhikari et al. ... 348/231.6 |
| 6,006,039 A | * | 12/1999 | Steinberg et al. .............. 396/57 |
| 6,115,137 A | * | 9/2000 | Ozawa et al. ............. 348/211.4 |
| 6,360,362 B1 | * | 3/2002 | Fichtner et al. ............. 717/168 |
| 6,380,975 B1 | * | 4/2002 | Suzuki ........................ 348/207 |
| 6,421,279 B1 | * | 7/2002 | Tobita et al. ........... 365/189.01 |
| 6,452,629 B1 | * | 9/2002 | Aizawa et al. ......... 348/231.99 |
| 6,493,743 B2 | * | 12/2002 | Suzuki ........................ 709/203 |

FOREIGN PATENT DOCUMENTS

| EP | 0 651 553 A1 | 5/1995 |
| EP | 0 675 648 A2 | 10/1995 |
| JP | 6-22189 | 1/1994 |
| JP | 06-022189 A | 1/1994 |
| JP | 6-197248 | 7/1994 |
| JP | 6-237431 | 8/1994 |
| JP | 7-28121 | 1/1995 |
| JP | 07-225687 A | 8/1995 |
| JP | 08-274934 A | 10/1996 |
| JP | 9-46577 | 2/1997 |
| JP | 09-046577 A | 2/1997 |
| JP | 09-046577 A | * 2/1997 |
| WO | WO97 30375 | 8/1997 |

* cited by examiner

*Primary Examiner*—David Ometz
*Assistant Examiner*—Nhan Tran
(74) *Attorney, Agent, or Firm*—Sughrue Mion, PLLC

(57) ABSTRACT

There is provided a digital camera to which external programs can be installed for appending desired functions thereto. Print image data generating programs to be stored in a recording medium in the digital camera are transmitted from a personal computer, an external extended recording medium of the digital camera, or an external device via a modem and a communication line. In any cases, the stored programs are read out at desired time to execute an print image data generating processing which transmits the print image data to a printer for printing the image. The stored program can be deleted at a desired time.

32 Claims, 9 Drawing Sheets

DIGITAL CAMERA AND FUNCTION APPENDING METHOD FOR THE SAME

CROSS-REFERENCE TO RELATED APPLICATION

This is a continuation-in-part application of PCT/JP98/01251 filed on Mar. 20, 1998.

BACKGROUND OF THE INVENTION

The present invention relates to a digital camera and, more particularly, a digital camera to which new functions can be attached and a function appending method of appending new functions to the digital camera. As such new functions, there are a direct print function for printing picked-up image data with the use of a printer, a communication function for transmitting the image data to terminals located at remote places by using a transmission network, etc.

In recent years, the digital camera (electronic still camera) are developed and on the market, and are now spreading. Normally the picked-up image result by the digital camera (digitized color image data) are printed. A personal computer (abbreviated as "PC" hereinafter) and a printer, a video printer, or the like are employed to output the print.

In the case of the digital camera which employs an internal memory medium to record the image data, an output terminal of the digital camera and an input terminal of PC are connected to each other via a serial cable, then image signals (image data) are installed into PC via an interface such as RS232C to apply the imaging processing, and then the color image are printed by the printer.

In the case of the digital camera which employs a memory card to record the image data, the image data are installed into PC by reading the memory card by a memory card reader (reading device) to apply the imaging processing, and then the color image are printed by the printer. In color printing, in order to print the color image (video) with high precision, print image data generating processing is executed by using programs on the PC side. And then bit map data, which are prepared every print color necessary for drawing, and a control signal are provided to the printer to perform the color printing operation.

The programs for the print image data generating processing are contained in programs which are called a printer driver in a data process module 210 shown in FIG. 10. A normal printer driver 220 contains three groups of programs, i.e., a rasterizer, a color correction module, and a halftone module.

First the JPEG (Joint Photographic Experts Group)-compressed image data are expanded by an expansion program 216 to be stored in a memory, then their Y, U, V components are converted into R, G, B components, and then the images are displayed on a monitor 230 by using an image display/selection application program 218. Then, the user selects the to-be-printed image from the displayed images.

The selected image data are processed by a rasterizer 221 in the printer driver 220. The image data are separated into three primary colors of R (red), G (green), and B (blue) to constitute RGB multitone (e.g., 256 tones) bit image data which are subjected to the raster conversion every color.

The color correction process is then applied to the RGB multitone bit image data, which are subjected to the raster conversion, via a color correction module 222 so as to correlate the image data with printing colors. Thus, RGB multitone bit the image data are converted into printing CMYK multitone bit image data which are separated into C (cyan), M (magenta), Y (yellow) and K (black).

The CMYK multitone bit image data is supplied to a halftone module 223 where halftone process (binarization process) is carried out by the dither method, the error diffusion method, etc. Thus, color allocation or arrangement on the bit map is decided every color, and binary bit maps (binary data tables) are formed respectively. Then, the PC sends the bit map data as well as the printing control signal and the plotting signal to a printer 240. The printer 240 executes a printing operation based on the control signal and the bit map data for each color to reproduce the color image on a recording paper.

Meanwhile, there is the digital camera which has a function for outputting the image as NTSC video signals and thus outputs the image to a video printer by using video signals. Since the video printer effects color adjustment by converting the input video signal into the digital signal once and then converting the digital signal into the analogue signal again, RGB multitone (e.g., 256 tones) bit image data which are separated into three primary colors of R, G, B can be obtained. However, since the D/A conversion in the digital camera and the A/D conversion on the video printer side are repeated, there are such problems peculiar to the analogue technology that the quality of image is easily deteriorated and also the image lacks the stability. Also, normally many application programs other than image (or video) print processing are installed in the PC because of its versatility. Since these application programs and the above printer driver are operated under management of OS such as Windows, MS-DOS (both are trademarks of Microsoft Corporation), etc., when the print processing of the image is performed, the user must execute the command input operation defined by the OS, to load the print processing application program and the printer driver from the storing device (e.g., magnetic disk), which store them, into an internal memory of the PC and to set the PC into the executable state. However, there are such problems that it take a lot of time (so-called an overhead time) to load the command input, the print processing application program, and the printer driver and that it requires time to start up the PC because several minutes are needed at least.

In addition, although the spread of the PC is remarkable, many problems to be solved further are still remain in handling the PC actually. There is an indication that a large majority of the PC owner merely have the PC but they cannot handle the PC. In order to print the resultant image picked up by the digital camera, there are also such problems that there will be caused disadvantages that it is hard to install them or it is not understood how to input the command even if these users buy the image (video) print processing application program and the printer driver and then try to install them into the PC.

Furthermore, there are also such problems that to prepare the expensive PC for merely printing the picked-up image spoils extremely the user's convenience.

SUMMARY OF THE INVENTION

From the above mentioned background, in order to spread the digital camera after this and to be employed ordinarily in the usual home, there are requests that the operation should be simplified in the print processing of the resultant picked-up image and the overhead time should be reduced to substantially zero.

When the requests such that simplification of the operation in the print processing of the resultant picked-up image and reduction of the overhead time into substantial zero are checked in the digital camera, it is preferable that, for example, the image data are directly output from the digital camera to the printer without the intervention of the PC and thus the picked-up image can be printed. Especially, since the user without the PC can also get simply the resultant picked- up image by the digital camera, satisfaction of such requests will be expected to contribute to the wide spread of the digital camera.

In this case, in order to effectively utilize the limited memory capacity of the digital camera, it is important that programs for generating print image data each having a relatively large program size can be installed from the external device into the digital camera as occasion demands or such installed programs can also be deleted. If the program is handled in such way, different programs, for example, a direct printing program, a communication program, an image correction program, or the like, can be replaced and then employed.

The present invention has been made in view of the above problems and it is an object of the present invention to provide a digital camera which has a function appending means, and a digital camera function appending method which can selectively attach functions necessary for the user to the digital camera and can also delete such attached functions according to the necessity.

In order to achieve the above object, there is provided a function appending method for a digital camera which records image data by converting an image pickup light photoelectrically, comprising the steps of: receiving a program recorded on an external recording medium connected to the digital camera exchangeably; storing the program into a recording medium provided in the digital camera; reading out the program from the recording medium in the digital medium at a desired time; and executing the program.

According to the present invention, there is also provided A function appending method for a digital camera which records image data by converting an image pickup light photoelectrically, comprising the steps of: receiving a program recorded on an external recording medium and sent therefrom via a communication line; storing the program into a recording medium provided in the digital camera; reading out the program from the recording medium in the digital medium at a desired time; and executing the program.

The methods may further comprise the step of deleting a desired program from recording medium in the digital camera.

In the methods, the program may be a print image data generating program or a communication program.

When the print image data generating program is recorded onto the recording medium as the program, the desired picked-up image can be output directly to the printing device by executing the program at a desired time. In addition, when the communication program is recorded onto the recording medium, the data can be communicate with the terminal device connected to the communication line by executing the program at a desired time.

In the methods, the image data may be recorded on the recording medium in the digital camera. Accordingly, there is no need to prepare the recording medium for recording the program and the recording medium for recording the image data separately.

The method of the present invention other than the above contains those evident from description of the best modes for implementing the present invention or the drawings as an aspect of the present invention.

According to the present invention, there is also provided a digital camera for recording image data by converting an image pickup light photoelectrically, comprising: external program reception means for receiving a program recorded on an external recording medium, which is connected thereto exchangeably, to store the program into a recording medium provided therein; and execution control means for reading out the program from the recording medium at a desired time to execute the read out program.

According to the present invention, there is also provided a digital camera for recording image data by converting an image pickup light photoelectrically, comprising: external program reception means for receiving a program recorded on an external recording medium and sent therefrom via a communication line to store the program into a recording medium provided therein; and execution control means for reading out the program from the recording medium at a desired time to execute the read out program.

The cameras may further comprise program deleting means for deleting a desired program from the recording medium provided therein.

In the cameras, the program may be a program for generating print image data, and the cameras may further comprise print data transmitting means for transmitting the print image data generated by executing the program to a printing device. Accordingly, the picture image can be printed only by preparing the digital camera and the printing device. Otherwise, the program may be a communication program to communicate data with a terminal device which is connected to the communication line. Accordingly, data can be communicated via the communication line by executing the program.

In the digital camera, the image data is recorded onto the recording medium provided therein. Accordingly, there is no necessity to prepare the recording medium for recording the program and the recording medium for recording the image data separately.

The digital camera of the present invention other than the above contains those evident from description of the best modes for implementing the present invention or the drawings as an aspect of the present invention.

DETAILED DESCRIPTION OF THE PREFERRED EMBODIMENTS

Next, embodiments of the present invention will be explained with reference to the accompanying drawings hereinafter.

Figure 1:
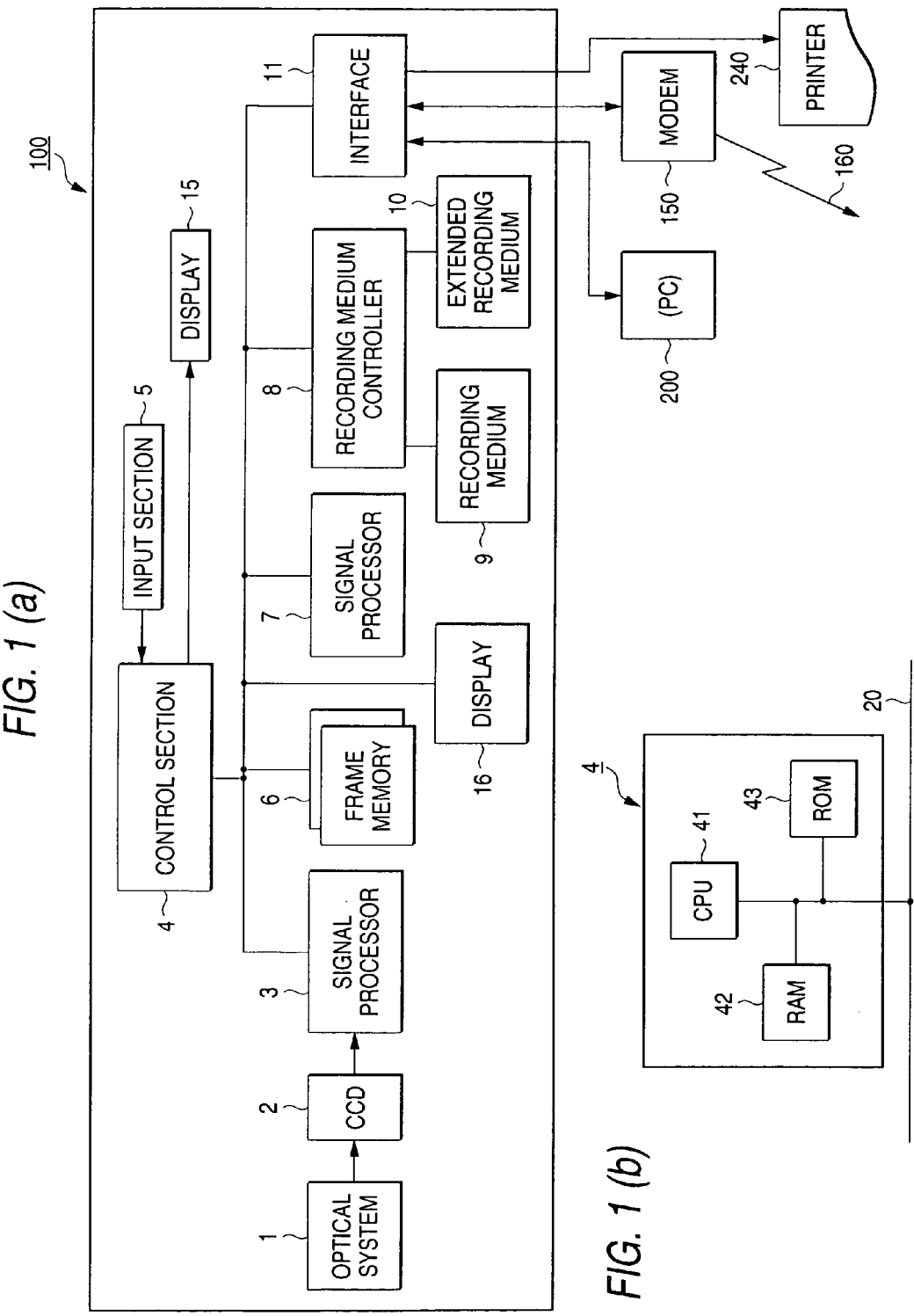
FIGS. 1(a) and (b) are block diagrams showing an example of a configuration of a digital camera according to the present invention.

FIG. 1(a) is a block diagram showing an example of a configuration of a digital camera 100 according to the present invention. The digital camera 100 comprises an optical system 1 composed of lenses, a diaphragm mechanism, etc., and for irradiating a reflected light reflected from an imaging object onto a CCD 2; a CCD 2 for converting an image pickup light supplied from the optical system 1 into an electric signal; a signal processor 3 for processing the signal from the CCD 2 and then outputting the signal as multi-valued (R, G, B) raster data (image data) to a frame memory 6; a control section 4 for controlling operations of the signal processor 3, the frame memory 6, a signal processor 7 and a recording medium controller 8, and controlling the image processing, the image compression processing, etc.; an input section 5 for inputting an instruction from the user by the operation of the switch, etc. to provide it to the control section 4; a signal processor 7 for converting the R, G, B raster data on the frame memory 6 into a luminance component Y and color difference components U and V; JPEG-compressing these components; and executing the contraction process to generate thumbnail image; a recording medium controller 8 for receiving the output of the signal processor 7, executing the write control to write JPEG-compressed image data (referred to as "JPEG image data" hereinafter) and contracted image data (referred to as "thumbnail image data" hereinafter) into a predetermined location of a recording medium 9 or an extended recording medium 10, and executing the read control to read respective recorded image data; an interface 11 employed to communicate the data between the digital camera 100 and external devices, e.g., a personal computer 200 such as the PC, a modem 150, and an ink jet color printer 240; a display 15 composed of LED indicators, etc., for displaying states of the switch and functional specifications; and a display 16 composed of a liquid crystal display, etc., for displaying the object image or the picked-up image.

The recording medium 9 is composed of a 4 MB flash memory being fixed on the inside of the camera 100. A 4-45 MB of Compact Flash (trademark of SanDisk Corporation) card is provided attachably as the extended recording medium 10. The extended recording medium 10 is controlled by the recording medium controller 8 to execute record of the image data, deletion of the recorded image data, and record/update/deletion of the program for appending the function. If the extended recording medium 10 consists of a memory card, a memory card interface (PCMCIA interface (ATA interface): not shown) is also provided.

The interface 11 is a serial interface. The present embodiment is so constructed that the print image data generating program containing the printer driver, set values, etc. are received from the PC via the interface 11. As described later, in place of receiving the print image data generating program containing the printer driver, the set values, etc. from the PC, they can be stored previously in the extended recording medium 10 such as the memory card, etc. and then installed into the camera 100 from the extended recording medium 10. Otherwise, the program stored on the extended recording medium 10 may be operated as it is.

FIG. 1(b) shows a configuration of the control section 4. The control section 4 is composed of a CPU 41, a RAM 42, and a ROM 43. Controller 430 (FIG. 3) which consists of programs necessary for operation control and data processing in the digital camera 100 is stored in the ROM 43. If programs constituting the controller 430 stored in the ROM 43 are stored in the recording medium 9, the ROM 43 may be omitted.

Figure 2:
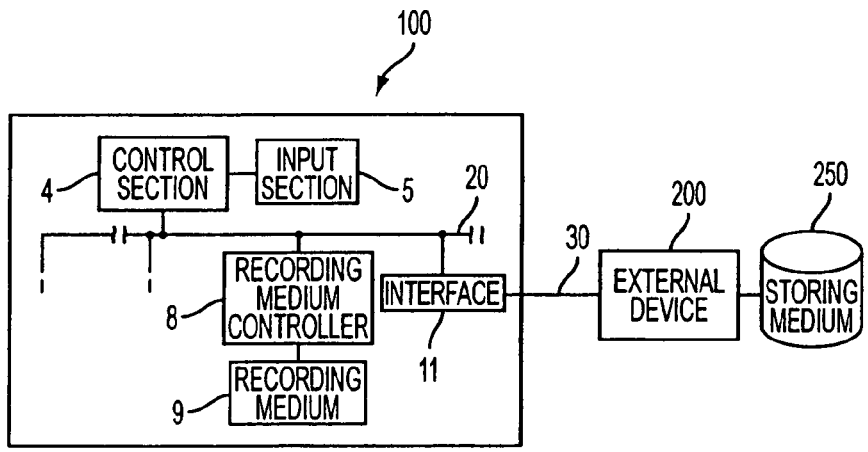
FIGS. 2(a) to (c) are views showing examples for installing a program into the digital camera.
Figure 2:
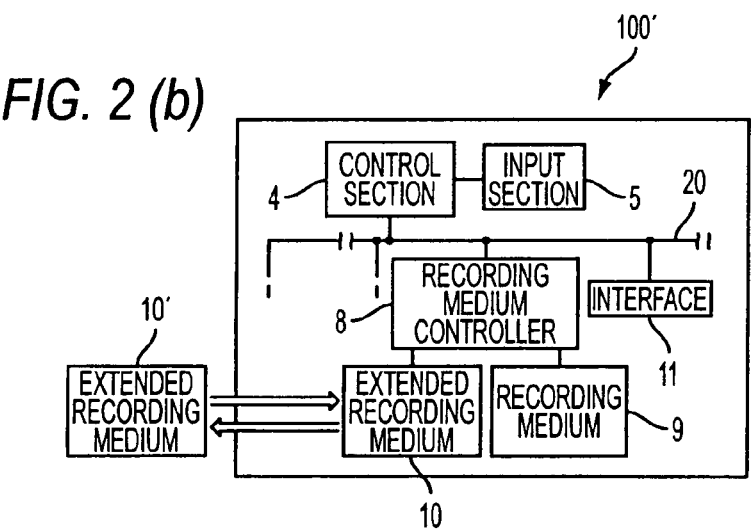
Figure 2:
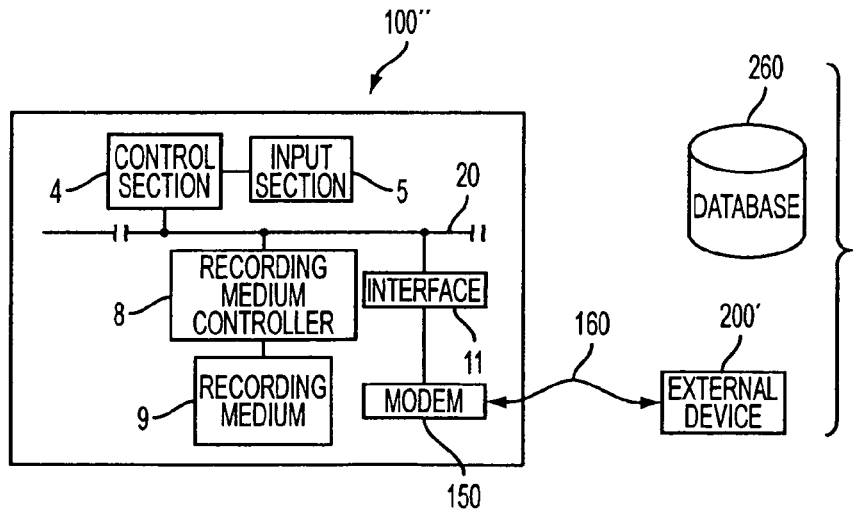

FIG. 2 is a view showing the case where installing of the program into the digital camera, i.e., the program and the set values necessary for the programs, etc. are stored into an internal memory (the recording medium 9 in the example in FIG. 1) from an external device 200 such as the PC, etc.

In an embodiment in FIG. 2(a), the program on a program storing medium 250 (e.g., magnetic disk or CD-ROM) is transmitted from the external device 200 such as the PC to the digital camera 100 via the interface 11, and the digital camera side receives the program and then stores it into the recording medium 9 under control of the control section 4 and the recording medium controller 8.

In an embodiment in FIG. 2(b), the program and the set values, etc. are stored previously in an external extended recording medium 10' such as the Compact Flash memory card, etc. Then, they are set in the digital camera 100' as the extended recording medium 10 and then stored in the recording medium 9 under control of the control section 4 and the recording medium controller 8. When the program is installed from the external extended recording medium 10' such as the memory card, etc., individual memory cards may be provided for easy selection of the user every optional function (added function), i.e., every option program.

In an embodiment in FIG. 2(c), the program and the set values, etc. are received from an external device 200' or a database 260 via the modem 150 and the communication line 160, and the digital camera 100" side stores the received data into the recording medium 9 under control of the control section 4 and the recording medium controller 8.

In addition, a configuration which enables selectively any one of installing of the programs from the PC, etc., installing of the programs from the external extended memory, and installing of the programs via the communication line can be implemented by combining two or all of embodiments in FIGS. 2(a), 2(b), 2(c). It is needless to say that a plurality of programs can be installed via any installing of the program.

Figure 3:
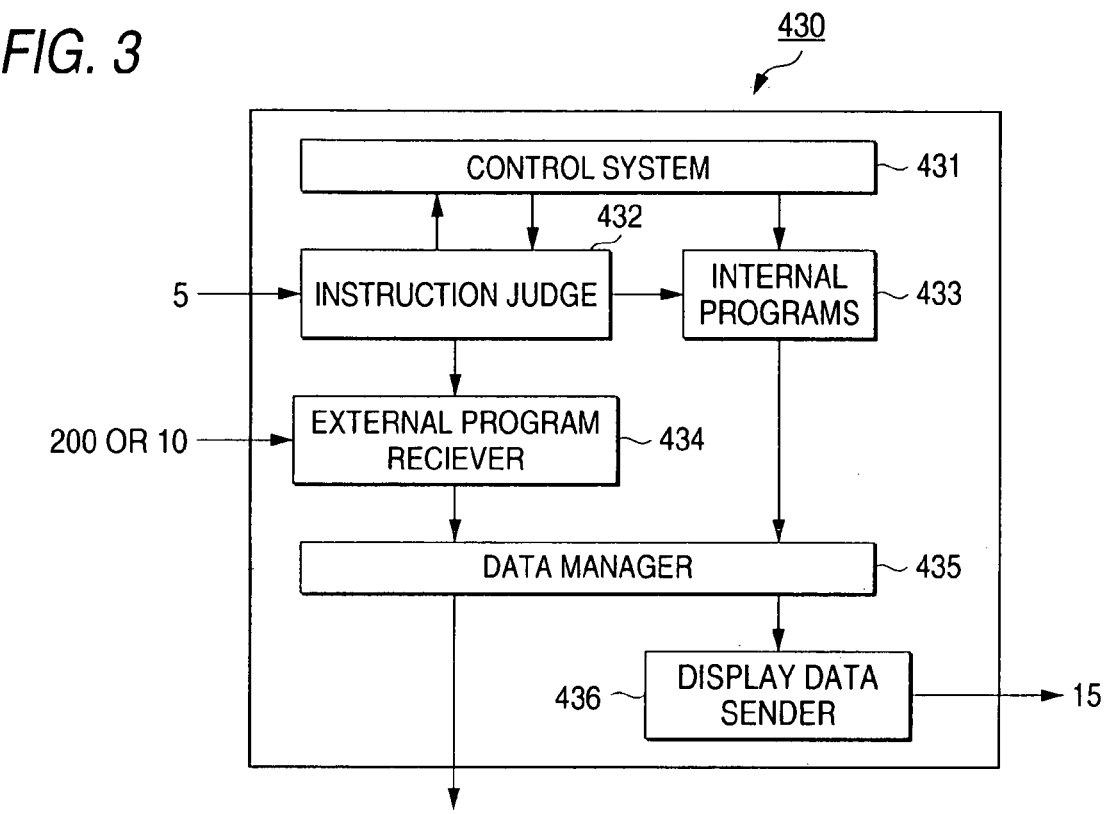
FIG. 3 is a view showing an example of a configuration of a controller stored in a ROM.

Operations such as installing, storing, reading, etc. of the program from the external device as described above are executed by the control section 4 based on the controller (program) 430 shown in FIG. 3.

FIG. 3 is a view showing an example of a configuration of the controller 430 stored in the ROM 43. The controller 430 is composed of: programs required for the operation control of the digital camera 100; image data processing programs required for the processing such as image data compression, etc. until the image data are stored; and control programs required for management and execution of the external program.

Such control programs are composed of programs required for managing and executing the external programs, and programs related to the image expansion processing, the print data generating processing and any other optional processing. The control programs install a necessary program from the programs stored in the external device, and controls execution of the installed program.

The controller 430 comprises a control system 431, an instruction judge 432, internal programs 433, an external program receiver 434, a data manager 435, and a display data sender 436. The control system 431 executes an overall operation control of the digital camera 100, for example, control of a diaphragm motor driver (not shown) of the optical system, operation control of the signal processor 3, the frame memory 6, the signal processor 7 and the recording medium controller 8, and execution control of the instruction judge 432 and the display data sender 436.

The instruction judge 432 judges what operation or processing is instructed by the user when a desired operation or processing is selected by the user by operating the input section 5 such as the switch, etc. provided on the digital camera 100, and then transfers the control to the concerned program of the internal programs 433 or to the external program receiver 434 in response to the judgement.

The internal programs 433 are made up of programs for storing the picked-up image into the recording medium 9, reading/writing the data from/into the extended recording medium 10, and controlling LED display in picking up the image, etc., and are built in the ROM 43 as basic processing programs. As an example of the internal program, there is a compression program in the JPEG specification, which is necessary for writing the image data into the recording medium 9 or the extended recording medium 10.

The external program receiver 434 is started when the external program installing instruction is issued from the instruction judge 432.

When the program is installed from the PC, etc., the external program receiver 434 assembles program codes, etc. received via the interface 11 into a program executable format, and then transfers the control to the data manager 435 (see first embodiment).

Also, when the program is installed from the external extended recording medium 10, the external program receiver 434 receives the program designated by the instruction judge 432 by checking a program registration list (e.g., directory) on the external extended recording medium received via the extended recording medium 10, and then transfers the control to the data manager 435 (see second embodiment).

Further, when the program is installed via the communication line, the external program receiver 434 contains a communication processing function for executing communication procedures (protocol), assembles the program codes received via the interface 11 into the program executable format, and transfers the control to the data manager 435 (see third embodiment).

The data manager 435 associates with load/deletion/ addition of the picked-up image data into/from the recording medium 9 and load/deletion/addition of the program code installed from the external device, and executes data management which is equivalent to file management which is widely conducted by the computer device such as the PC, etc.

The image data and the thumbnail image data are processed by the internal programs 433 or a circuit equivalent to this, and then installed onto the recording medium 9 or the extended recording medium 10 by the recording medium controller 8.

The program, etc. (the program codes and the set values) installed by the external device are installed onto the recording medium 9 by the recording medium controller 8. In this case, there is a necessity that the recording location of the image data on the recording medium 9 must be managed. For example, the data must be written into empty areas (i.e., write enable areas) when the image data are recorded, but there is a need that the recording medium controller 8 must recognize which area of the recording medium 9 is the empty areas.

For this reason, the data manager 435 is constructed to handle a sheet of image data as the data file, provide its registration list (e.g., directory) separately, and record the registration list itself in a predetermined location of the recording medium (a predetermined block if the recording medium 9 is composed of the flash memory, or a predetermined sector and track if the recording medium 9 is composed of the magnetic disk).

In the registration list, at least data type, image data number (or ID number), recording start position and recording end position of the image data, pointer (continuous recording start position), and write inhibit/enable flags are written into the recording medium 9 as contents every one sheet of image data or one program unit (described later), and at the same time, the record of the image data is started from the recording start position.

As the data type, there are the image data, the thumbnail image data, and the program. In the case of the program, it is preferable that the data type is defined according to type of the program (distinction such as the print data generating program, other optional function program, etc.).

Also, the pointer is the continuous recording start position which is searched by the recording medium controller 8 when an area where one data is to be written is smaller than the size of the data. According to employment of the pointer, the data can be logically continuously written and read. In this case, if the recording end position coincides with the end position of the written data, a particular code (e.g., 0000) is written into the pointer.

As for the write inhibit/enable flags, normally the write inhibit code (flag) is written when the data are installed while the write inhibit flag is replaced with the write enable flag when the data are deleted, etc.

Since the data manager 435 checks the registration list, then treats the data as the read inhibit data if the write enable flag is written into the area, and then writes new data in the area, the data can be treated to be deleted in fact.

The display data management means 435 is not limited to a system which provides the directory and then manages the JPEG image data and the programs to be searched according to the direct access system, as described above. The means may be constructed to write several place data identification numbers to the top of the thumbnail image data, the JPEG image data, and the program (for example, A01 to An for the thumbnail image data, B01 to Bn for the JPEG image data, and C01 to Cn for the program) upon writing the data, and then to manage recording information such as attributes, write location, occupied areas of respective data by searching the identification numbers from the head of the recording medium 9.

Since the flash memory is employed as the recording medium 9 in the embodiment, the physically written information are canceled in unit of block when the data are deleted. In this case, in the latter search system, if the predetermined place is checked from the top, it becomes invalid information (e.g., "00000000" in a binary notation. The block size is different by the makers such as 1 block=512 B (byte), 32 KB (kilobyte). The 512 B one is employed in the present embodiment.)

The display data sender 436 outputs selectively LED display data by the internal programs 433, display data such as the image, the menu, etc., optional function display data by the externally installed program, and display data as the execution result of the optional function onto the LED 15, the small control LCD, or the liquid crystal display 16 of the digital camera 100.

In this case, the above externally installed program is stored in the internal recording medium 9. The externally installed program may be executed by the CPU as it is upon execution, or may be executed by the CPU by installing sequentially into the RAM 42 according to the control system. If the program is executed on the internal recording medium 9, the data manager 435 stores the program in the internal recording medium 9 by assigning a continuous memory space thereto. Further, like the case of the print data generating processing, if sizes of the processing programs are large and a large working area is needed, the frame memory 6 may be constructed to be employed as the working area.

EMBODIMENTS

Figure 4:
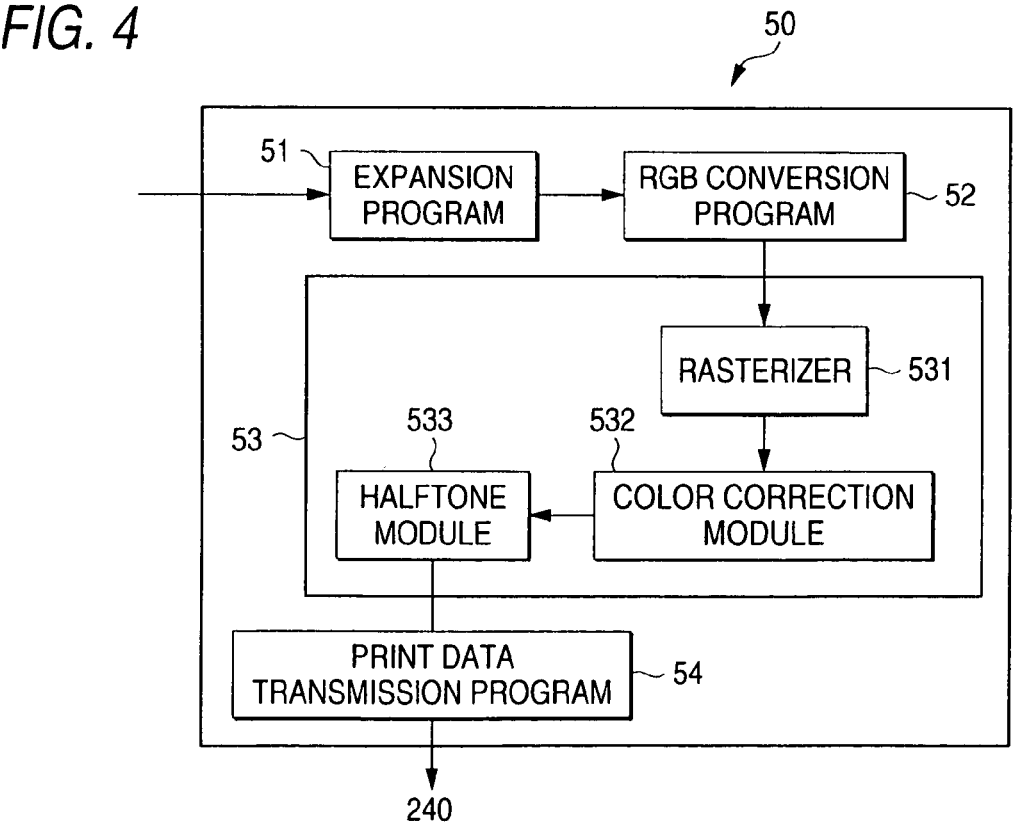
FIG. 4 is a view showing an example of print image data generating programs being installed into the digital camera.

FIG. 4 is a view showing an example of print image data generating programs which are installed into the digital camera from the external device. The installed print image data generating programs 50 comprises a data expansion program 51, an RGB conversion program 52, a printer driver 53, and a print data transmission program 54. Also, the printer driver 53 includes a rasterizer 531, a color correction module 532, and a halftone module 533, which have the same configurations as the printer driver for the print image data generating processing by the personal computer, etc.

First Embodiment (1) Installing of External Program

Figure 5:
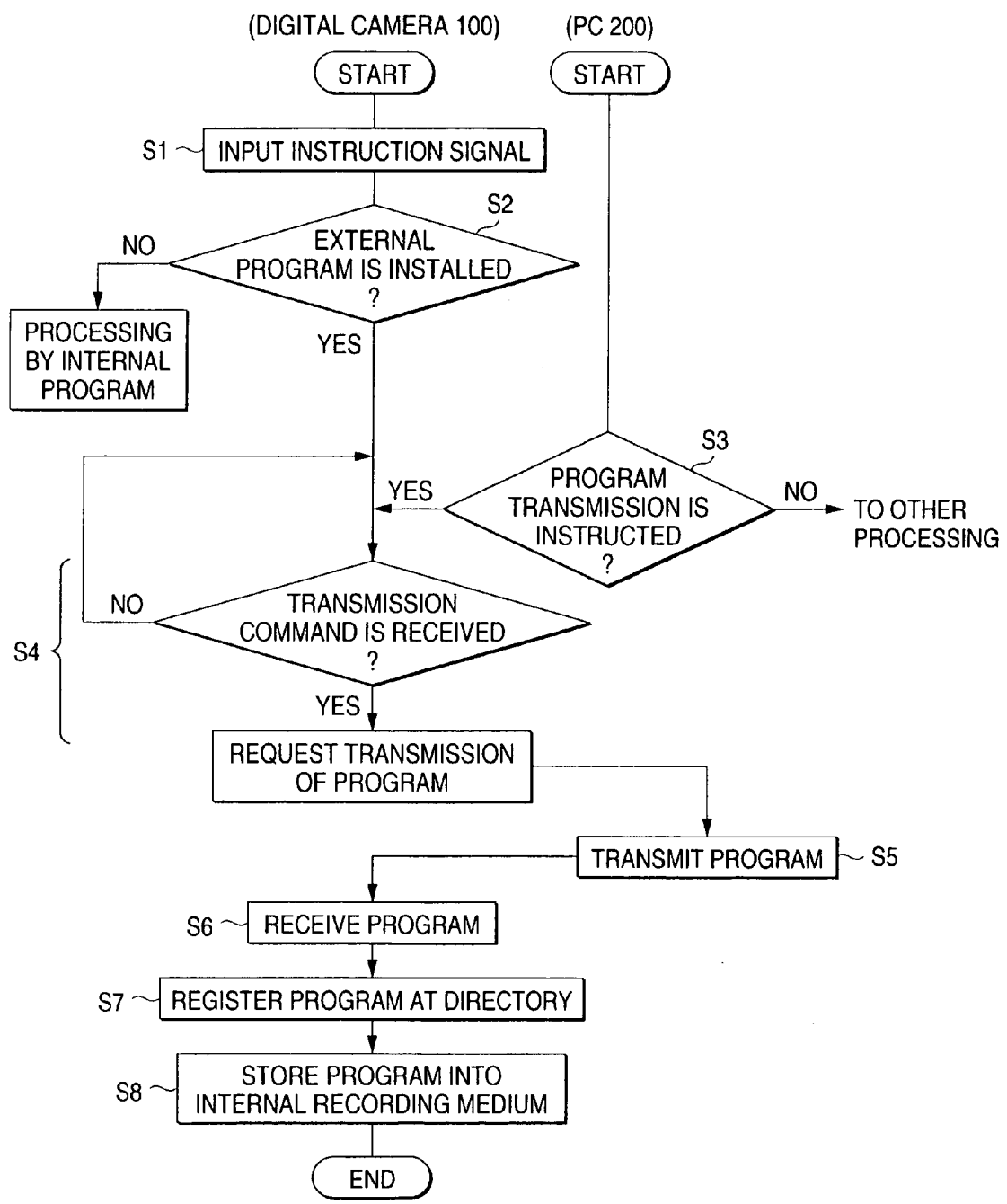
FIG. 5 is a flowchart applied when the print image data generating program is installed from a personal computer, etc.

FIG. 5 is a flowchart applied when the print image data generating program should be installed from the external personal computer system such as the PC, etc. into the digital camera 100. The installing of the print image data generating program will be explained with reference to FIG. 1, FIG. 2(*a*), FIG. 3, and FIG. 4 hereinafter.

As premises, it is assumed that a power supply of the digital camera 100 is turned ON, the user turns ON a program installing switch provided on the digital camera 100, the PC 200 and the digital camera 100 are connected to each other via a dedicated cable 30, and the user executes the operation to transmit the program from the program storing medium 250 (e.g., magnetic disk) of the PC 200 to the digital camera 100.

When the program installing switch is turned ON, the input section 5 sends a switch-ON signal to the control section 4 (S1). The program installing switch is used commonly with an image direct print option selecting switch, for example. In addition, in place of the provision of the program installing switch, the menu is displayed on the liquid crystal display 16 to select the program installing menu. Further, program installing can be started by transmitting a dedicated command for installing the program from the PC 200 to the digital camera 100. In this case, steps S1, S2 are omitted and the process is started from step S3.

When the control section 4 receives the above signal, the control system 431 transfers the control to the instruction judge 432. Then, the instruction judge 432 checks whether or not the concerned signal is a signal equivalent to the program installing switch ON. If the concerned signal is the signal equivalent to the program installing switch ON, the instruction judge 432 transfers the control to the external program receiver 434. Conversely, unless the concerned signal is the signal equivalent to the program installing switch ON, the instruction judge 432 further checks the type of the signal and then transfers the control to the corresponding internal programs 433 (S2).

On the PC 200 side, when the program transmitting operation is carried out, the program transmitting command is transmitted to the digital camera 100 and then waits the response from the digital camera 100 (S3).

When the external program installing instruction corresponds to the program installing from the PC, etc., the external program receiver 434 waits for the reception of the program transmission command from the PC 200. Then, when the external program receiver 434 receives the program transmission command, it transmits a request-to-send program command to the PC 200 (S4).

When the PC 200 side receives the request command for transmitting program, it transmits the program code (object program) of the print image data generating program and the set values from the program storing medium 250 to the digital camera 100 via the PC side interface and the dedicated cable 30 (S5).

The external program receiver 434, when receives the program code and the set values from the PC 200 via the interface 11, assembles the result into a predetermined format and then transfers the control to the data manager 435 (S6).

The data manager 435, when receives the program code from the external program receiver 434, searches the directory (file registration list) of the recording medium 9 via the recording medium controller 8 to find empty areas or the write enable areas, then writes the recording start locations of the data type indicating the program, the program ID, the program code into the directory, and then starts the writing of the program code into the recording medium 9 (S7). In this case, if the writing area is smaller than an amount of the program code in data size, the data manager 435 writes the continuous writing location into the pointer, and then continues to write the data into the continued area. However, if the program should be executed on the recording medium 9, the data manager 435 searches the continued area to write the data. If no necessary continued area can be searched, the data manager 435 performs the error process.

When the writing process of the read program code for one program unit is terminated, the data manager 435 writes the storing end location and the write inhibit flag into the directory, and then prepares for the writing process for a succeeding program unit (S8). In this disclosure, the "program unit" means the program if the program is composed of one module, otherwise individual module or segment if the program is composed of a plurality of modules or segments.

(2) Deletion of Installed Program

Figure 6:
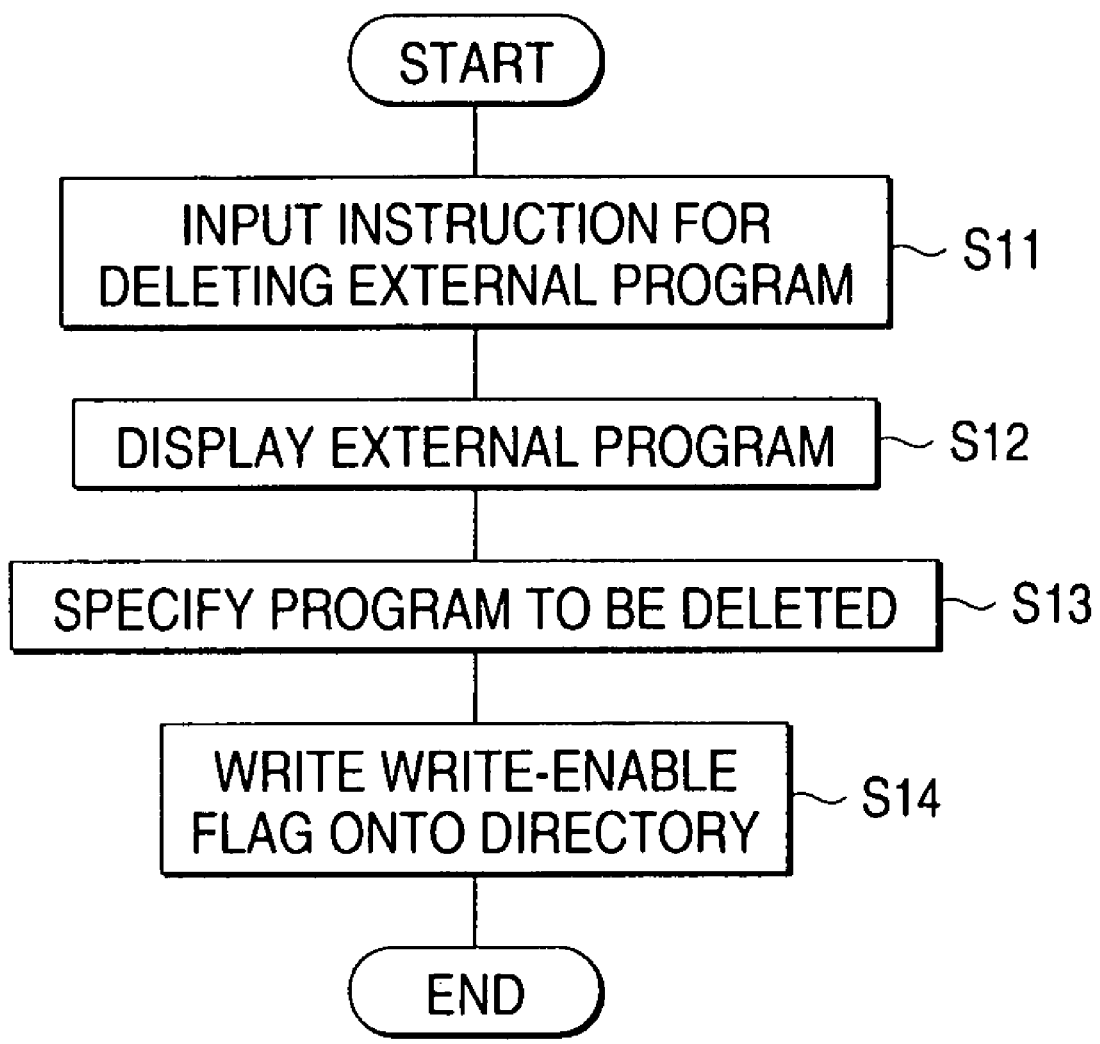
FIG. 6 is a flowchart applied when the installed print image data generating program is deleted.

FIG. 6 is a flowchart applied when the print image data generating program being installed and recorded should be deleted.

When a program deletion switch is turned ON, the input section 5 sends a program deletion switch ON signal to the control section 4 (S11). In this case, in place of the program deletion switch, the menu may be displayed on the liquid crystal display 16 to select a print image data generating program deletion menu.

When the control section 4 receives the program deletion signal, the control system 431 transfers the control to the data manager 435. The data manager 435 displays the program ID in the directory on the liquid crystal display 16 (S12).

When the user designates the deletion program by the input section 5, the deletion object program number is sent to the control section 4 (S13).

When the control section 4 receives a signal containing the information indicating the deletion, the data manager 435 checks the program ID list in the directory of the recording medium 9 via the recording medium controller 8, then the write inhibit flag of the concerned program is replaced with the write enable flag, and then the deletion processing is completed (S14).

(3) Direct Print of Picked-Up Imaged

Figure 7:
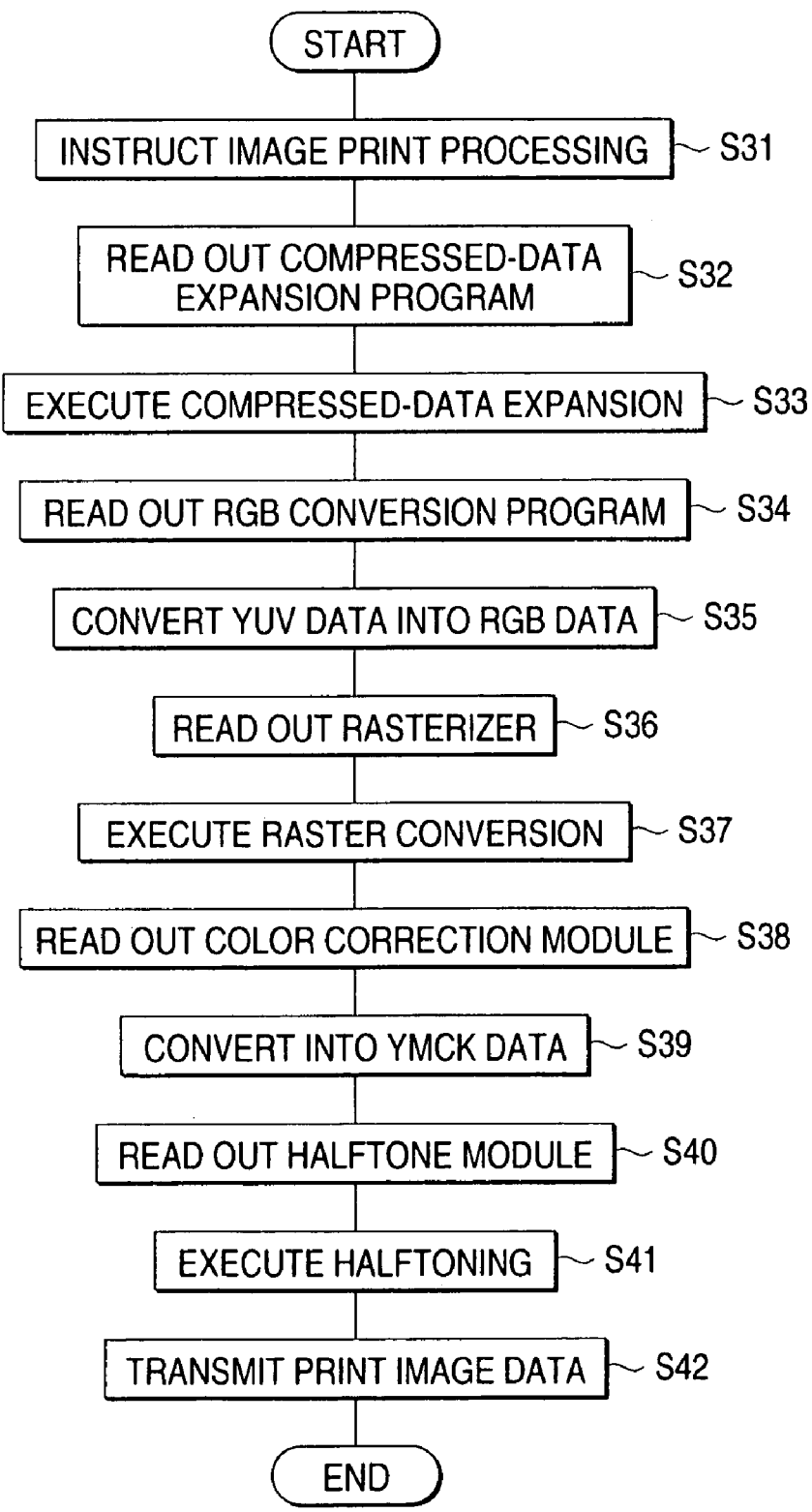
FIG. 7 is a flowchart showing an example of generation of print image data for a color ink jet printer by the print image data generating programs.

FIG. 7 is a flowchart showing an example of generation of the print image data for the color ink jet printer by the installed print image data generating programs.

When the user turns ON the request switch of print processing for desired image, the input section 5 sends the request for image print processing to the control section 4 (S31). In this case, in place of the request switch for image print processing, the menu may be displayed on the liquid crystal display 16 to select an image printing function.

When the control section 4 receives a signal equivalent to the request for image print processing, the control system 431 first instructs the recording medium controller 8 to read the compressed data expansion program 51 of the image print processing programs 50 stored in the recording medium 9, and then the recording medium controller 8 transfers the compressed data expansion program 51 to the RAM 42 via the bus 20 (S32).

When transfer of the compressed data expansion program 51 is ended, the control system 431 carries out execution control of the compressed data expansion program 51. Then, the compressed data expansion program 51 transfers the corresponding image data (compressed data) to the frame memory 6 via the recording medium controller 8, and executes the expansion process for the compressed image data (S33).

After the expansion process for the compressed image data has been completed, the control system 431 causes to transfer the RGB conversion program 52 from the recording medium 9 to the RAM 42 (S34).

When transfer of the RGB conversion program 52 is completed, the control system 431 performs execution control of the RGB conversion program 52. Thus, the RGB conversion program 52 converts the image data consisting of YUV components in the frame memory 6 into the image data consisting of R (red), G (green), B (blue) components (S35).

When the RGB conversion process of the image data is completed, the control system 431 causes to transfer the rasterizer 531 of the printer driver 53 from the recording medium 9 to the RAM 42 (S36).

When transfer of the rasterizer 531 is finished, the control system 431 performs the execution control of the rasterizer 531. Then, the rasterizer 531 changes the image data into the RGB multitone (e.g., 256 tones) bit image data which are subjected to the raster conversion every R, G, B (S37).

When the process effected by the rasterizer 531 is ended, the control system 431 causes to transfer the color correction module 532 of the printer driver 53 from the recording medium 9 to the RAM 42 (S38).

When transfer of the color correction module 532 is finished, the control system 431 performs the execution control of the color correction module 532. Then, in order to correlate the raster data converted by the rasterizer 531 with the printing color, the color correction module 532 applies the color correction process to the RGB multitone bit image data to convert them into the printing CMYK multitone bit image data consisting of C (cyan), M (magenta), Y (yellow), and K (black) (S39).

When the process conducted by the color correction module 532 is terminated, the control system 431 causes to transfer the halftone module 533 of the printer driver 53 from the recording medium 9 to the RAM 42 (S40).

When transfer of the halftone module 533 is completed, the control system 431 performs the execution control of the halftone module 533. Then, the halftone module 533 applies a halftoning to the CMYK multitone bit image data, which are obtained via the color correction module 532, by the dither method, the error diffusion method, etc. Thus, color allocation or arrangement on the bit map is decided every color, and then binary bit maps (binary data tables) are formed respectively (S41).

When the process of the halftone module 533 is terminated, the control system 431 transfers the control to the print data transmission program 54. The print data transmission program 54 transmits the printing control signal and binary bit map data to the ink jet color printer 240 via the parallel interface 13 (S42).

As a result, the color printer 240 can receive directly the printing control signal and the printing data from the digital camera 100 and then print/reproduce the picked-up image on the recording paper.

Second Embodiment

Figure 8:
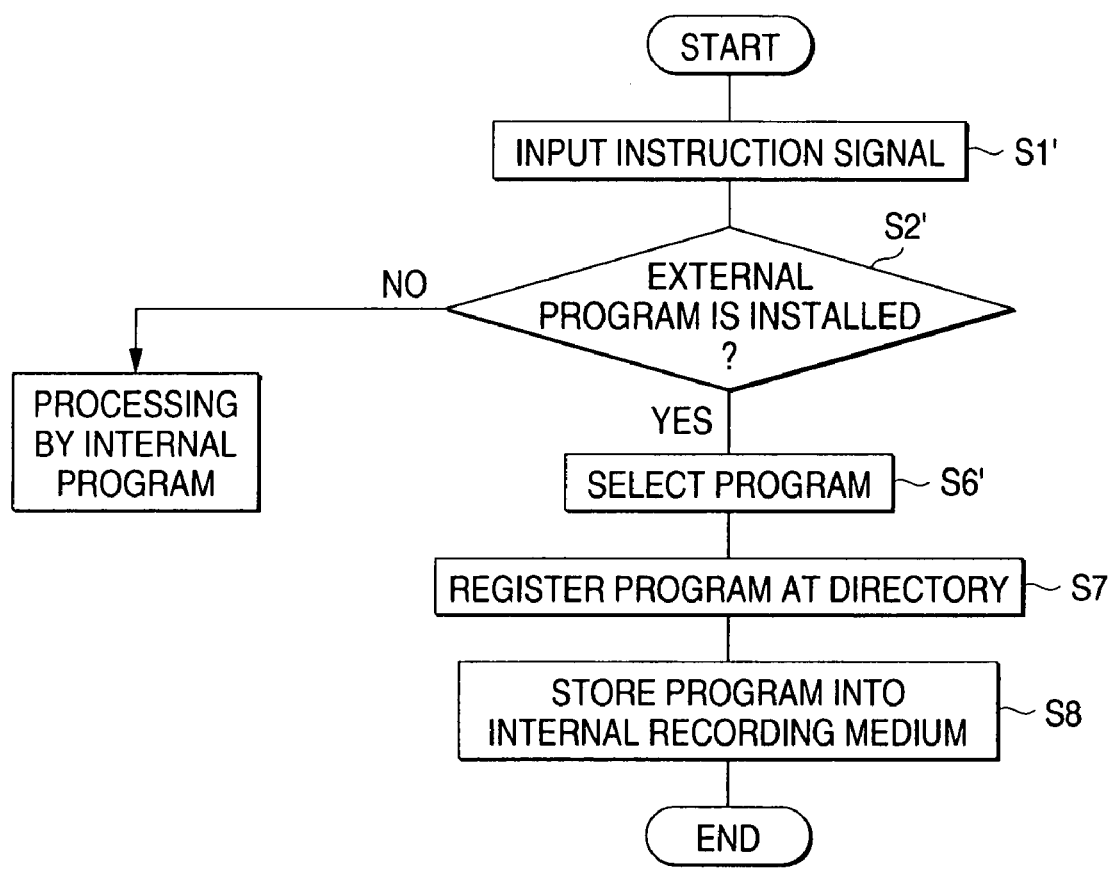
FIG. 8 is a flowchart applied when the print image data generating program is installed from an external extended recording medium such as a memory card, etc.

FIG. 8 is a flowchart applied when the print image data generating program is installed from the externally extended recording medium such as the memory card, etc. to the digital camera 100. In this case, deletion of the installed and recorded print image data generating program and also the direct print processing onto the ink jet printer device by the installed print image data generating program are similar to those in the first embodiment (FIG. 6, FIG. 7). The second embodiment will be explained with reference to FIG. 1, FIG. 2(b), FIG. 3, and FIG. 4 hereinafter.

As premises, it is assumed that the power supply of the digital camera 100 is turned ON, the extended recording medium such as the memory card in which the print image data generating program is stored is set into the digital camera 100 by the user, and the user turns ON the program installing switch.

In FIG. 8, when the program installing switch is turned ON, the input section 5 sends the signal equivalent to the switch ON to the control section 4 (S1'). The program installing switch is used commonly with the image direct print option selecting switch, for example. In addition, in place of the provision of the program installing switch, the menu is displayed on the liquid crystal display 16 to select the program installing menu.

When the control section 4 receives the above signal, the control system 431 transfers the control to the instruction judge 432. Then, the instruction judge 432 checks whether or not the concerned signal is a signal equivalent to the program installing switch ON. If the concerned signal is the signal equivalent to the program installing switch ON, the instruction judge 432 transfers the control to the external program receiver 434. Conversely, unless the concerned signal is the signal equivalent to the program installing switch ON, the instruction judge 432 further checks the type of the signal and then transfers the control to the corresponding internal programs 433 (S2').

When the external program installing instruction corresponds to the program installing from the externally extended memory, the external program receiver 434 checks the program registration list (e.g., directory) on the received externally extended recording medium 10', then selects the program instructed by the instruction judge 432, and then transfers the control to the data manager 435 (S6').

The data manager 435, when receives the program from the external program receiver 434, searches the directory (file registration list) of the recording medium 9 via the recording medium controller 8 to find empty areas or the write enable areas, then writes the recording start locations of the data type indicating the program, the program ID, the program code into the directory, and then starts the writing of the program into the recording medium 9 (S7). In this case, if the writing area is smaller than an amount of the program code in data size, the data manager 435 writes the continuous writing location into the pointer, and then continues to write the data into the continued area.

When the writing process of the read program code for one program unit is terminated, the data manager 435 writes the storing end location and the write inhibit flag into the directory, and then prepares for the writing process for a succeeding program unit (S8).

Third Embodiment

Figure 9:
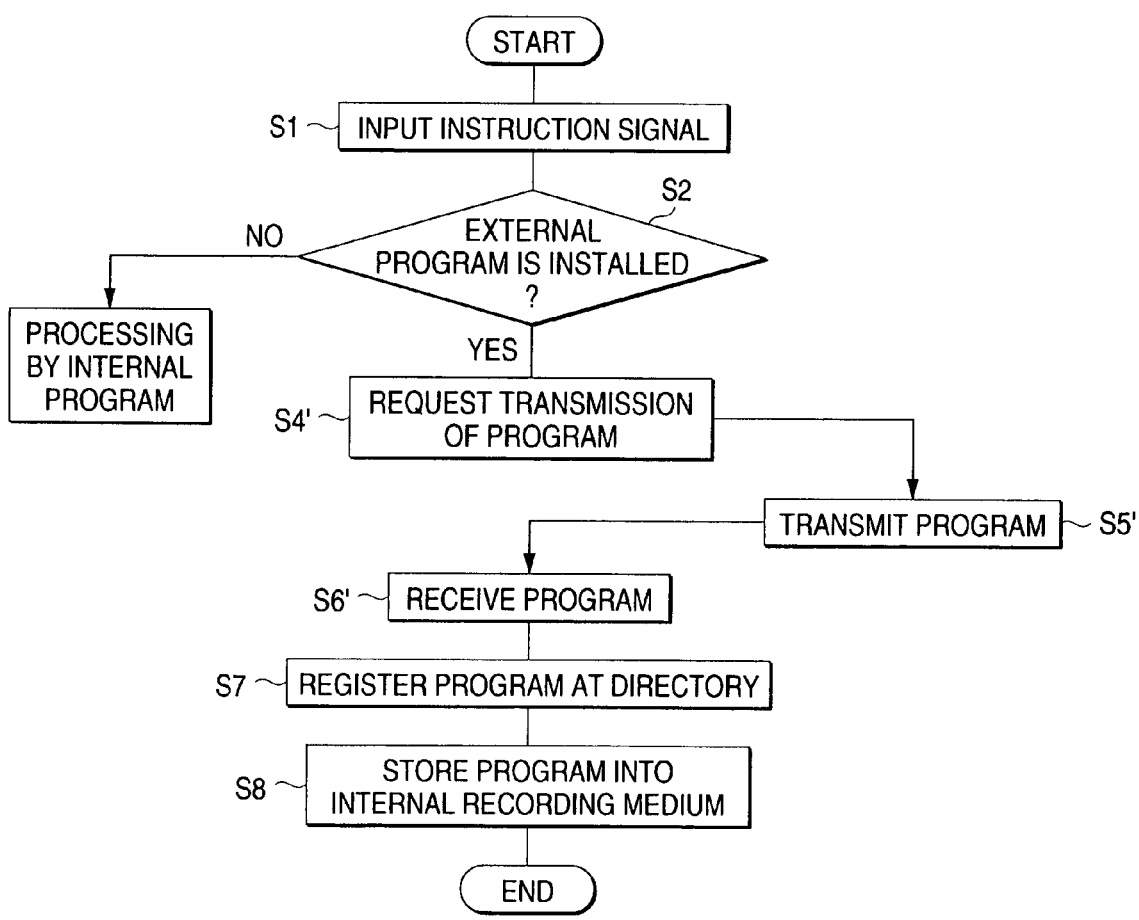
FIG. 9 is a flowchart applied when the print image data generating program is installed from a terminal device being connected to a communication line.
Figure 10:
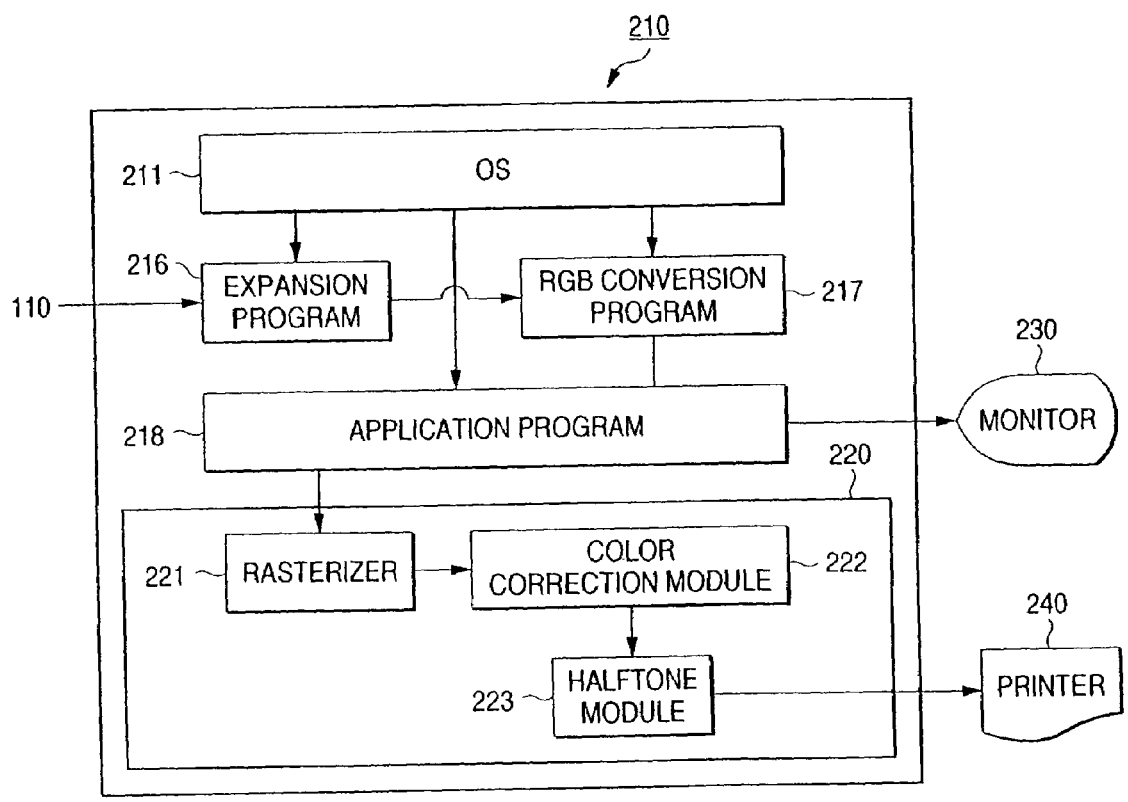
FIG. 10 is a view showing an example of print image data generating programs being employed when the print image data are generated by the personal computer.

FIG. 9 is a flowchart applied when the print image data generating program is installed into the digital camera 100 from the terminal device being connected to the communication line. In this case, deletion of the installed and recorded print image data generating program and also the direct print processing onto the ink jet printer device by the installed print image data generating program are similar to those in the first embodiment (FIG. 6, FIG. 7). The third embodiment will be explained with reference to FIG. 1, FIG. 2(*c*), FIG. 3, and FIG. 4 hereinafter.

As premises, it is assumed that the power supply of the digital camera 100 is turned ON, and the digital camera 100 is connected to the external device via the communication line.

When the program installing switch is turned ON, the input section 5 sends the signal equivalent to the switch ON to the control section 4 (S1). The program installing switch is used commonly with the image direct print option selecting switch, for example. In addition, in place of the provision of the program installing switch, the menu is displayed on the liquid crystal display 16 to select the program installing menu.

When the control section 4 receives the above signal, the control system 431 transfers the control to the instruction judge 432. Then, the instruction judge 432 checks whether or not the concerned signal is a signal equivalent to the program installing switch ON. If the concerned signal is the signal equivalent to the program installing switch ON, the instruction judge 432 transfers the control to the external program receiver 434. Conversely, unless the concerned signal is the signal equivalent to the program installing switch ON, the instruction judge 432 further checks the type of the signal and then transfers the control to the corresponding internal programs 433 (S2).

When the external program installing instruction corresponds to the program installing via the communication line, the external program receiver 434 transmits the request-to-send program command to the external device 200' via the modem 150 and the communication line 160 (S4').

When the external device 200' side receives the request command for transmitting program, the external device 200' transmits the print image data generating program, etc. (the program code and the set value) to the digital camera 100 via the modem 150 and the communication line 160 (S5').

The external program receiver 434, when receives the program, etc. via the communication line 160, assembles the result into a predetermined format and then transfers the control to the data manager 435 (S6').

The data manager 435, when receives the program, etc. from the external program receiver 434, searches the directory (file registration list) of the recording medium 9 via the recording medium controller 8 to find empty areas or the write enable areas, then writes the recording start locations of the data type indicating the program, the program ID, the program code into the directory, and then starts the writing of the program into the recording medium 9 (S7). In this case, if the writing area is smaller than an amount of the program code in data size, the data manager 435 writes the continuous writing location into the pointer, and then continues to write the data into the continued area.

When the writing process of the read program code for one program unit is terminated, the data manager 435 writes the storing end location and the write inhibit flag into the directory, and then prepares for the writing process for a succeeding program unit (S8).

In the above embodiments, the example where the print image data generating program is installed from the external device into the digital camera has been explained. However, the externally installed program is not limited to the print image data generating program. For example, the communication program which is required to communicate the data between the external device and the communication terminal via the communication line is installed from the external device (or the concerned terminal device), and then the thumbnail image, the JPEG compressed image data, or the print image data, which are stored in the recording medium, are transmitted to the concerned terminal device. In addition to this, installing of the application program which is necessary for the execution of the additional functions of the digital camera and transmission of the execution result to the external device may be conducted similarly.

Also, the image data recording medium is employed as the storing location of the externally installed program. However, for example, the digital camera may be constructed to provide the installed program storing memory separately. In addition, the frame memory is employed as the working area in executing the installed program, but the RAM or other memory provided to the digital camera may be employed as the working area. Otherwise, the installed program may be operated on the internal recording medium 9.

Further, in order to enable installing of the external program selectively via the external device such as the PC, etc., the extended recording medium, or the communication line, the installing method selecting switch may be provided on the main body of the digital camera, otherwise an installing method selecting menu may be displayed on a display like the liquid crystal display to be selected.

Three embodiments of the present invention have been explained as above, but it is needless to say that the present invention is not limited to the above embodiments and various variations may be adopted.

According to the digital camera function appending method or the digital camera of the present invention, since the program can be installed from the external device or the extended recording medium, then stored in the internal recording medium and then executed, there is no need to increase the programs stored in the ROM, etc. Therefore, the limited memory capacity of the digital camera can be utilized effectively.

Also, since recorded program can be deleted, it can be avoided to use the internal recording medium wastefully and thus to utilize the internal recording medium efficiently as the image memory, and therefore the sacrifice of the recordable image data can be suppressed to the lowest minimum. Since the user who wants to add the function can supplement necessary functions only, the needs of individual user can be satisfied.

In addition, since the print image data generating program can be installed from the external device, the print image data can be output directly from the digital camera to the printer and printed by the printer. In other words, direct print of the picture image without the intervention of the computer can be achieved.

What is claimed is:

1. A function appending method for a digital camera which records image data by converting an image pickup light photoelectrically, comprising:

waiting for a program transmitting command from an external recording medium, wherein the program transmitting command is the first communication, which is between the digital camera and the external recording medium and which relates to a transmission of a program recorded on the external recording medium;

receiving the program transmitting command from the external recording medium;

transmitting a request-to-send program command to the external recording medium after receiving the program transmitting command;

receiving the program recorded on the external recording medium connected to the digital camera exchangeably;

storing the program into a recording medium provided in the digital camera;

reading the program from the recording medium in the digital camera at a desired time; and executing the program.

2. The function appending method as set forth in claim 1, further comprising deleting a desired program from recording medium in the digital camera.

3. The function appending method as set forth in claim 1, wherein the program is a print image data generating program.

4. The function appending method as set forth in claim 1, wherein the program is a communication program.

5. The function appending method as set forth in claim 1, wherein the image data is recorded on the recording medium in the digital camera.

6. The function appending method as set forth in claim 1, wherein the recording medium is a flash memory.

7. A function appending method for a digital camera which records image data by converting an image pickup light photoelectrically, comprising:

waiting for a program transmitting command from an external recording medium, wherein the program transmitting command is the first communication, which is between the digital camera and the external recording medium and which relates to a transmission of a program recorded on the external recording medium;

receiving the program transmitting command from the external recording medium;

transmitting a request-to-send program command to the external recording medium after receiving the program transmitting command;

receiving the program recorded on the external recording medium and sent therefrom via a communication line, storing the program into a recording medium provided in the digital camera;

reading the program from the recording medium in the digital camera at a desired time; and executing the program.

8. The function appending method as set forth in claim 7, further comprising deleting a desired program from recording medium in the digital camera.

9. The function appending method as set forth in claim 7, wherein the program is a print image data generating program.

10. The function appending method as set forth in claim 7, wherein the program is a communication program.

11. The function appending method as set forth in claim 7, wherein the image data is recorded on the recording medium in the digital camera.

12. The function appending method as set forth in claim 7, wherein the recording medium is a flash memory.

13. The function appending method as set forth in claim 7, wherein the communication line is external to the digital camera.

14. The function appending method as set forth in claim 7, wherein the communication line is connected to an external device.

15. The function appending method as set forth in claim 14, wherein the external device comprises a personal computer.

16. The function appending method as set forth in claim 14, wherein the external device comprises a modem.

17. A digital camera for recording image data by converting an image pickup light photoelectrically, comprising:

external program reception unit with a program installing function, for waiting for a program transmitting command from an external recording medium, receiving the program transmitting command from the external recording medium, transmitting a request-to-send program command to the external recording medium after receiving the program transmitting command, receiving a program recorded on the external recording medium, which is connected thereto exchangeably, and storing the program into a recording medium provided in the digital camera; and execution control unit for reading the program from the recording medium at a desired time to execute the read out program, wherein the program transmitting command is the first communication, which is between the digital camera and the external recording medium and which relates to the transmission of the program recorded on the external recording medium.

18. The digital camera as set forth in claim 17, further comprising-program deleting unit for deleting a desired program from the recording medium provided therein.

19. The digital camera as set forth in claim 17, wherein the program is a program for generating print image data, and further comprising:

print data transmitting unit for transmitting the print image data generated by executing the program to a printing device.

20. The digital camera as set forth in claim 17, wherein the program is a communication program for communicating data with a terminal device connected to the communication line.

21. The digital camera as set forth in claim 17, wherein the image data is recorded onto the recording medium provided therein.

22. The digital camera as set forth in claim 17, wherein the recording medium is a flash memory.

23. A digital camera for recording image data by converting an image pickup light photoelectrically, comprising:

external program reception unit with a program installing function, for waiting for a program transmitting command from an external recording medium, receiving the program transmitting command from the external recording medium, transmitting a request-to-send program command to the external recording medium after receiving the program transmitting command, receiving a program recorded on the external recording medium and sent therefrom via a communication line, and storing the program into a recording medium provided in the digital camera; and execution control unit for reading the program from the recording medium at a desired time to execute the read out program, wherein the program transmitting command is the first communication, which is between the digital camera and the external recording medium and which relates to the transmission of the program recorded on the external recording medium.

24. The digital camera as set forth in claim 23, further comprising program deleting unit for deleting a desired program from the recording medium provided therein.

25. The digital camera as set forth in claim 23, wherein the program is a program for generating print image data, and further comprising:

print data transmitting unit for transmitting the print image data generated by executing the program to a printing device.

26. The digital camera as set forth in claim 23, wherein the program is a communication program for communicating data with a terminal device connected to the communication line.

27. The digital camera as set forth in claim 23, wherein the image data is recorded onto the recording medium provided therein.

28. The digital camera as set forth in claim 23, wherein the recording medium is a flash memory.

29. The digital camera as set forth in claim 23, wherein the communication line is external to the digital camera.

30. The digital camera as set forth in claim 23, wherein the communication line is connected to an external device.

31. The digital camera as set forth in claim 30, wherein the external device comprises a personal computer.

32. The digital camera as set forth in claim 30, wherein the external device comprises a modem.

* * * * *